Patented Nov. 3, 1936

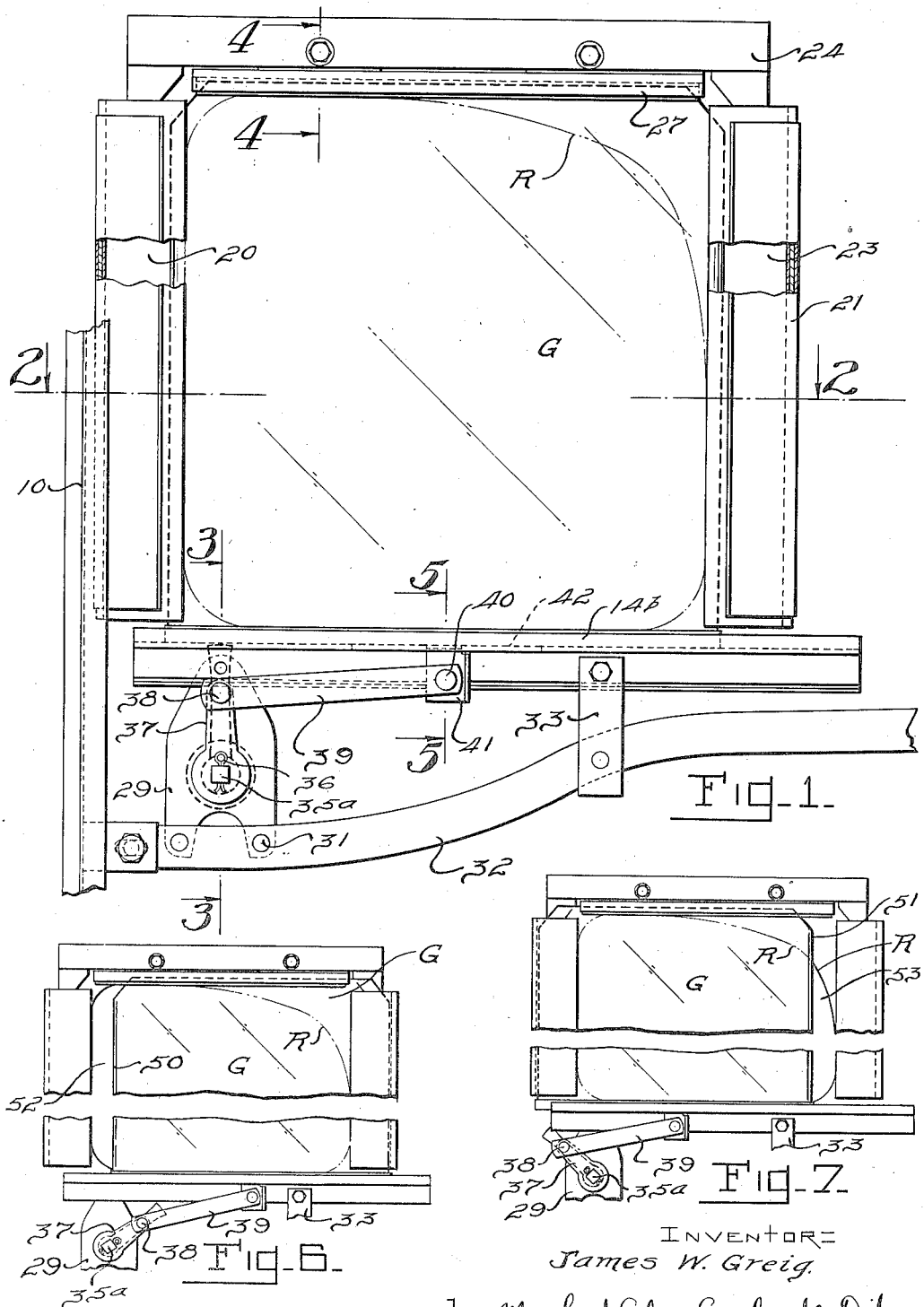

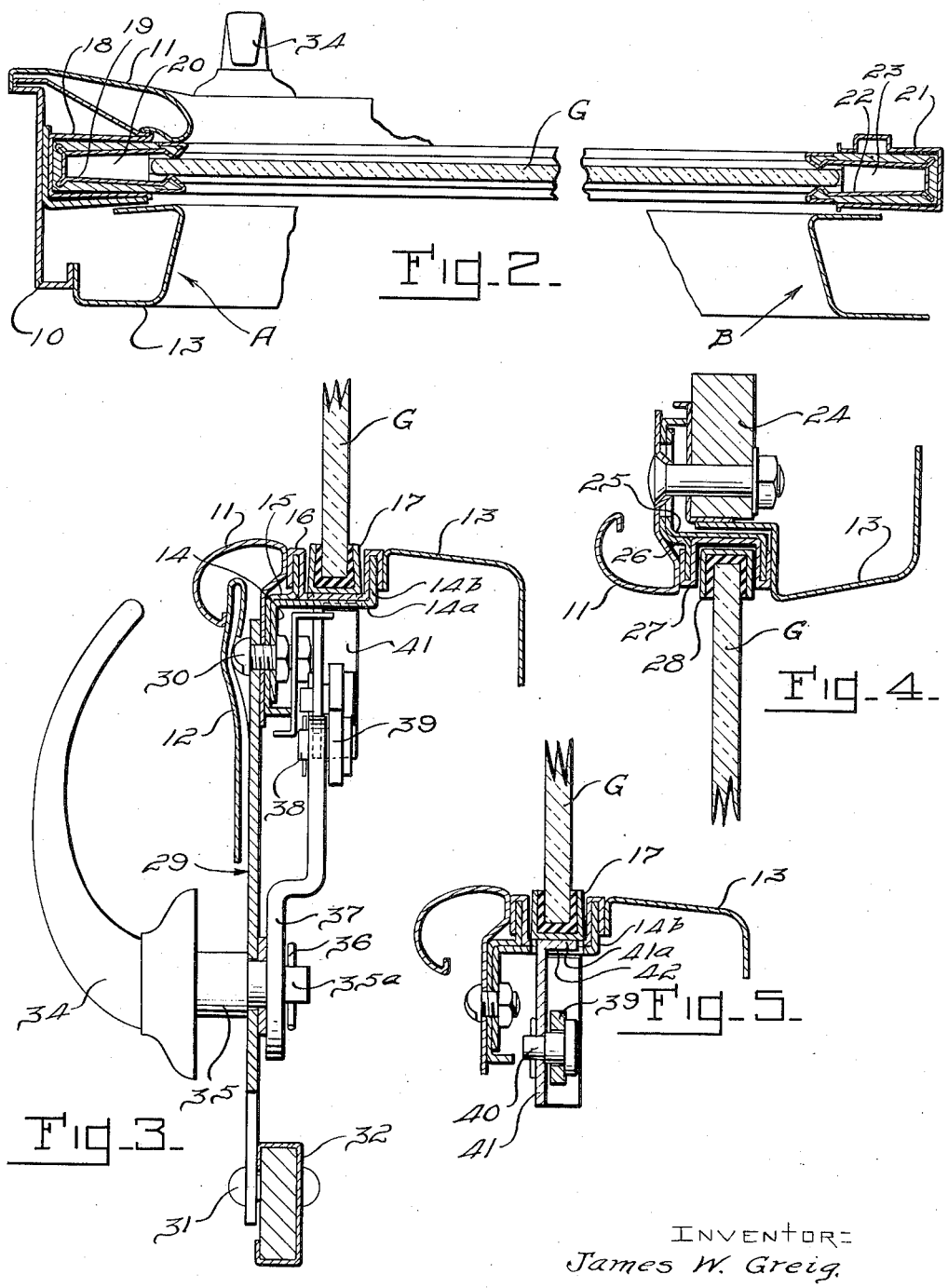

2,059,452

UNITED STATES PATENT OFFICE 2,059,452

VENTILATING WINDOW

James W. Greig, Grosse Pointe Park, Mich., assignor to Hudson Motor Car Company, Detroit, Mich., a corporation of Michigan Application October 25, 1933, Serial No. 695,065

4 Claims. (Cl. 296—47)

This invention relates to ventilating windows for automobile bodies, an object thereof being to provide an improved window structure wherein a sliding glass panel is provided for controlling a rear window opening in the side wall of the body in such a manner as to induce, during the forward travel of the vehicle, an exchange of air between the interior and the exterior of the body.

A further object of the invention is to provide in an automobile body a window opening in the rear part of the body within which a glass panel is mounted for limited longitudinal movement in the plane of the glass so as to provide an adjustable ventilating opening adjacent the forward edge of the glass and an outwardly jutting pillar in the side wall of the body, the construction being such as to induce by pressure differences a flow of air from the interior of the body through said opening during the forward travel of the vehicle.

Other objects of this invention will appear in the following description and appended claims, reference being had to the accompanying drawings forming a part of this specification wherein like reference characters designate corresponding parts in the several views.

Fig. 1 is a fragmentary side elevation taken from the inside of an automobile body and illustrating a ventilating window structure embodying the present invention.

Fig. 2 is a fragmentary horizontal section taken through a portion of the body substantially on lines 2—2 indicated in Fig. 1 and in the direction of the arrows.

Fig. 3 is a fragmentary vertical section taken through a portion of the body substantially on lines 3—3 indicated in Fig. 1 and in the direction of the arrows.

Fig. 4 is a fragmentary vertical section taken through a portion of the body substantially on lines 4—4 indicated in Fig. 1 and in the direction of the arrows.

Fig. 5 is a fragmentary vertical section taken through another portion of the body substantially on lines 5—5 indicated in Fig. 1 and in the direction of the arrows.

Figs. 6 and 7 are views taken from the inside of the body and illustrating different ventilating positions of the window glass.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated one adaptation of the invention as applied to the rear quarter window of a conventional type automobile body. It will be readily understood that the invention may be applied to any rear window opening in the side wall of the vehicle body. Referring to the drawings wherein one embodiment is illustrated by way of example, there is shown at 10 a suitable upright body pillar forming in the present instance one jamb face of the rear door of an automobile body. The rear quarter window opening is formed in rear of this pillar and at the inner side of the body this opening is framed by paneling in the form of a garnish molding 11 forming the inside window reveal. At the outer side of the body the window opening is framed by flanged paneling 13 forming the outside window reveal, the inner margin of the reveal being indicated by the line R, see Figs. 1, 6 and 7. The inner paneling or garnish molding 11 overlies the upper edge of a conventional fabric covered trim panel 12 at the inner side of the body. Extending along the lower edge of the window opening and forming the supporting sill for the glass panel G is a horizontal Z-shaped bar 14 having a horizontal web or flange portion 14a for supporting the lower edge of the glass and also having an outer vertical flange 14b. An inner horizontally extending metal strip 15 is secured to the inner vertical flange of the sill member 14 and the strip 15 is provided with a vertical flange extending along the inner lower edge of the window glass. A channel-shaped bar 16 is confined between the parallel flanged portions of the metal bars 14 and 15 and is flanged to embrace the edges thereof, as illustrated in Fig. 3. This channel-shaped bar is supported upon the horizontal flange 14a and provides a channel-shaped track or runway for slidingly receiving the lower edge of the window glass. Secured along the lower edge of the glass panel G is a channel-shaped retainer strip 17 which is housed within the channel member 16 so as to permit horizontal sliding movement of the glass in the plane of the latter.

Adjacent the forward edge of the glass G is a vertical channel member 18 carried by the pillar 10, and confined within the member 18 is a composite channel-shaped strip 19 adapted to overlie the forward edge of the window glass when the latter is in position, as illustrated in Fig. 2, to fully close the window opening. In this position of the glass it will be noted that the channel 19 is of such depth as to provide a space or gap 20 between the forward edge of the glass and the bottom of the channel, thus permitting the glass to be shifted in its plane a predetermined distance forwardly. Adjacent the rear edge of the window glass is a vertical channel member 21 within which is confined a composite channel strip 22 similar to the strip 19 and of sufficient depth to provide a space 23 between the rear edge of the glass and the bottom of the channel when the glass is in fully closed position within the window opening.

The upper edge of the window opening is framed by means of a horizontal frame member 24 fixed to the body and which may be of wood or other suitable material. Bolted to the frame member 24 is a Z-shaped metal bar or rail 25 flanged to form the header of the window opening and also providing, with a flanged metal strip 26, a channel-shaped runway for the upper edge of the glass panel G, see Fig. 4. Secured to the members 25 and 26 and confined between the parallel flanges thereof is a metallic channel member 27 providing a track or guideway for slidingly receiving a channel-shaped retainer strip 28 secured along the upper edge of the window glass.

From the foregoing it will be seen that the glass panel G is mounted within the window frame for horizontal sliding movement in the plane of the glass. Moreover, it will be seen that the glass panel may be shifted forwardly into the space 20 to provide a vertically disposed ventilating slit or opening between the rear edge of the glass and the rear vertical edge of the window frame, and that the glass may be shifted rearwardly into the space 23 to produce a similar ventilating slit or opening between the forward edge of the glass and the adjacent vertical edge of the window frame.

The window regulator mechanism, in the present embodiment of the invention, is carried by a supporting plate 29 bolted at 30 to the sill members 14 and 15 and also secured at 31 to a fiber filled metal channel rail 32 fixed to the framework of the body. The sill members of the window opening are also supported in position from the rail 32 by means of a bar 33, as illustrated in Fig. 1. The regulator mechanism is operated from the inside of the body by means of a suitable handle 34 having a shaft 35 journaled in an aperture in the plate 29. Mounted on the inner squared end 35a of the shaft and held in position by a cotter pin 36 is a swinging arm 37. The upper end of this arm is pivoted at 38 to one end of a push-and-pull link 39, the opposite end of which is pivoted at 40 to an actuator block 41. This block may be formed up from a sheet steel blank and has an upper horizontal flange 41a welded or otherwise secured to the bottom of the channel retainer strip 17. The upper end of the actuator block 41 projects through a longitudinal slot 42 cut through the bottom flange 14a of the sill member 14, thus providing a guide slot to permit longitudinal sliding movement of the actuator block 41. The forward and rear edges of the slot 42 function as stops to limit the travel of the actuator block in opposite directions, and hence limiting the range of travel of the window glass.

From the foregoing it will be readily understood that upon swinging the crank handle 34 rearwardly in the manner illustrated in Fig. 6, the glass panel G will be shifted rearwardly into the deep runway 23, providing a front vertical ventilating slit or opening 52 adjacent the forward edge 50 of the glass. Conversely, when the crank handle 34 is swung in the opposite direction, or forwardly, as illustrated in Fig. 7, the window glass will be shifted forwardly into the deep channel or runway 20 providing a rear vertical ventilating slit or opening 53 at the rear edge 51 of the window. On the other hand when the handle is in its vertical position, illustrated in Figs. 1 and 2, the glass panel G will entirely close the window opening and the forward and rear edges thereof will be confined within the open edges of the channel ways 20 and 23.

An important feature of the present invention resides in the fact that the body construction is such that when the window glass is shifted rearwardly to produce the ventilating opening 52, a flow of air will be induced by suction from the interior of the body through said opening. It will be noted that the forward reveal portion 13 forms a jutting wall and in effect a baffle whereby, during forward travel of the vehicle, the flow of air along the side of the body past said reveal portion 13 (see Fig. 2) will produce a low pressure zone at A. Since a lower pressure will be created in this zone as compared with the pressure within the body, air will be drawn by suction from the interior of the body through the ventilating opening at the forward edge 50 of the glass. On the other hand, with the window glass in the position shown in Fig. 7, a flow of air into the interior of the body through the ventilating opening 53 will be induced, since the passage of air along the outside of the body and over the rear part of the outer jutting reveal will produce a relatively high pressure zone at B. Hence by shifting the window forwardly in this manner the occupant of the vehicle, during its travel, may secure a flow of air from the outside into the body past the rear edge 51 of the window glass.

I claim:

1. In an automobile body having an upright pillar in the side wall thereof and an opening in said side wall forwardly of said pillar, said body having exterior metal panelling inwardly flanged to form the marginal reveal of a window opening lying immediately in rear of said pillar, a single glass panel of an area to entirely close said window opening and slidable rearwardly for a limited distance to provide an upwardly extending ventilating slot between the forward upright edge of the glass and the adjacent edge of said window reveal, said glass panel being mounted so that its plane extends within the width of the pillar and said panel flanging at the forward upright edge of the window opening extending outwardly from the plane of the glass panel sufficiently to produce a low pressure zone in the locality thereof effective to withdraw air by suction from the interior of the body through said ventilating slot during the forward travel of the automobile.

2. In an automobile body having an upright pillar in the side wall thereof and an opening in said side wall forwardly of said pillar, said body having exterior metal panelling inwardly flanged to form the marginal reveal of a window opening lying immediately in rear of said pillar, a single glass panel of an area to entirely close said window opening and slidable rearwardly for a limited distance to provide an upwardly extending ventilating slot between the forward upright edge of the glass and the adjacent edge of said window reveal, said glass panel being mounted so that its plane extends within the width of the pillar and said panel flanging at the forward upright edge of the window opening extending outwardly from the plane of the glass panel sufficiently to produce a low pressure zone in the locality thereof effective to withdraw air by suction from the interior of the body through said ventilating slot during the forward travel of the automobile, mechanism connected to a longitudinal edge of said glass panel for sliding the same longitudinally in its plane, interior panelling concealing said mechanism, and a handle accessible from the interior of the body for actuating said mechanism.

3. In an automobile body having an upright pillar in the side wall thereof and an opening in said side wall forwardly of said pillar, said body having exterior metal panelling inwardly flanged to form the marginal reveal of a window opening lying immediately in rear of said pillar, a single glass panel of an area to entirely close said window opening and slidable rearwardly for a limited distance to provide an upwardly extending ventilating slot between the forward upright edge of the glass and the adjacent edge of said window reveal, said glass panel being mounted so that its plane extends within the width of the pillar and said panel flanging at the forward upright edge of the window opening extending outwardly from the plane of the glass panel sufficiently to produce a low pressure zone in the locality thereof effective to withdraw air by suction from the interior of the body through said ventilating slot during the forward travel of the automobile, regulator mechanism connected to a longitudinal edge of the glass panel for sliding the glass longitudinally in its plane and including means effective to limit the longitudinal travel of the glass, and a handle accessible at the inside of the body for operating said mechanism.

4. In an automobile body having an upright pillar in the side wall thereof and an opening in said side wall forwardly of said pillar, said body having a window opening in said side wall located in rear of said pillar, the combination of a single glass panel of an area to entirely close said window opening and shiftable rearwardly therein only a limited distance, a channel-shaped metal retainer member secured to a longitudinal edge of the glass, guide means cooperating with said retainer member for guiding the glass longitudinally into or out of position to provide a ventilating opening at the front upright edge of the glass, the front upright marginal edge of said window opening jetting outwardly from the plane of the glass sufficiently to induce by suction a flow of air from the interior of the body through said opening during the forward travel of the automobile, and means connected to the retainer member and concealed within the wall of the body for shifting the glass longitudinally into or out of ventilating position.

JAMES W. GREIG.